United States Patent [19]

Côte

[11] 4,098,541
[45] Jul. 4, 1978

[54] APPARATUS FOR EVACUATING MANURE

[76] Inventor: Camille Côte, St-Félix de Kingsey, co. Drummond, Quebec, Canada

[21] Appl. No.: 780,825

[22] Filed: Mar. 24, 1977

[51] Int. Cl.² .............................................. B65G 53/40
[52] U.S. Cl. ...................................... 302/53; 40/221; 220/345; 302/26; 302/41
[58] Field of Search .......................... 302/26, 27, 41, 52, 302/53, 54; 214/16 R; 220/345, 346, 351; 49/360, 404, 405, 414, 415, 213, 221, 224

[56] References Cited

U.S. PATENT DOCUMENTS

| | | | |
|---|---|---|---|
| 3,103,276 | 9/1963 | Schmitzer | 198/362 |
| 3,237,993 | 3/1966 | Gurney | 302/53 |
| 3,687,311 | 8/1972 | Nesseth | 198/736 X |
| 3,872,981 | 3/1975 | Hedlund | 198/531 X |
| 3,953,078 | 4/1976 | Aitken | 302/27 |
| 3,955,853 | 5/1976 | Rusterholz | 302/53 X |

FOREIGN PATENT DOCUMENTS

| | | | |
|---|---|---|---|
| 578,421 | 9/1924 | France | 302/53 |
| 268,667 | 4/1927 | United Kingdom | 302/53 |

*Primary Examiner*—Evon C. Blunk
*Assistant Examiner*—James L. Rowland
*Attorney, Agent, or Firm*—Raymond A. Robic; Francis B. Francois; Arthur Schwartz

[57] ABSTRACT

An apparatus for evacuating manure. The manure is collected in a container in the barn, and then transferred therefrom via a conduit at the bottom of the container by introducing air under pressure into into the top of the container. The conduit leads up to the approximate center of a collecting area to introduce the manure into the bottom of a manure pile at the collecting area.

5 Claims, 3 Drawing Figures

APPARATUS FOR EVACUATING MANURE

The present invention is concerned with an apparatus for evacuating manure.

In barns, and other buildings housing animals, particularly cows, manure must be collected and removed from the barns on a frequent basis. Many systems are known for mechanically collecting and removing the manure. These systems generally operate on the princi- pal of scraping or otherwise conveying the manure from the barn floor or one or more gutters toward one end of the barn, and then conveying the manure out from the end of the barn on an inclined conveyor which drops the manure onto a manure pile at a collecting station outside the barn. Known systems of this type are disclosed for example in U.S. Pat. Nos. 855,496, 974,540, 1,194,171 and 3,294,406.

Collection systems of this type present drawbacks, particularly in the winter. Each fresh layer of manure added to the manure pile can freeze and thus slow down decomposition of the manure. Also, the manure tends to stick to the inclined conveyor and special means are required on the conveyor to knock the manure off. Further, the height of the conveyor must be adjusted as the pile builds up. In addition, the inclined conveyor has many moving parts and thus requires frequent service and maintenance.

The object of the present invention is to provide an apparatus for evacuating manure which eliminates or minimizes the above mentioned drawbacks and which is simple and reliable in operation.

In accordance with the present invention, the manure is collected in a container within the barn, and then transferred therefrom, by fluid pressure, via a conduit to the bottom of a manure pile outside the barn.

In transferring the manure from the barn to the bottom of the manure pile, the drawback of freezing is minimized and decomposition occurs more rapidly. The manure is thus rendered useable as fertilizer more quickly. In using fluid pressure to transfer the manure through a conduit, the number of moving parts employed are greatly reduced, thus reducing service and maintenance requirements.

The system employed is quite simple in construction and use, and reliable in operation.

More especially, the apparatus for evacuating manure according to the invention comprises a manure collecting container and a conduit leading away from the bottom of the container. The container has an inlet opening for manure at the top and means for opening and closing the inlet opening. The container also has means for introducing fluid under pressure into the top of the container to move manure out of the container via the conduit.

Valve means are provided in the conduit for opening and closing the conduit.

The apparatus may include a collection area for the manure to the approximate center of which the conduit leads up, to introduce manure to the bottom of the manure pile at the collection area.

According to a preferred embodiment of the invention, the means for closing and opening the inlet opening includes a closure plate movably mounted within the container to move linearly between a position closing the inlet and a position alongside the inlet opening it. The closure plate, substantially horizontal, is mounted for movement on slightly inclined supports which slope up toward the inlet from the side of the container. Means are provided for moving the plate along the supports.

According to another preferred embodiment, a seal is mounted on the inside wall of the top portion of the cylinder surrounding the inlet opening. The closure plate abuts the seal when moved to close the inlet.

The means for opening and closing the conduit may comprise a valve in the conduit, and pneumatic cylinder means for operating the valve.

A preferred embodiment of the invention will now be described in detail having reference to the accompanying drawings in which.

Figure 1:
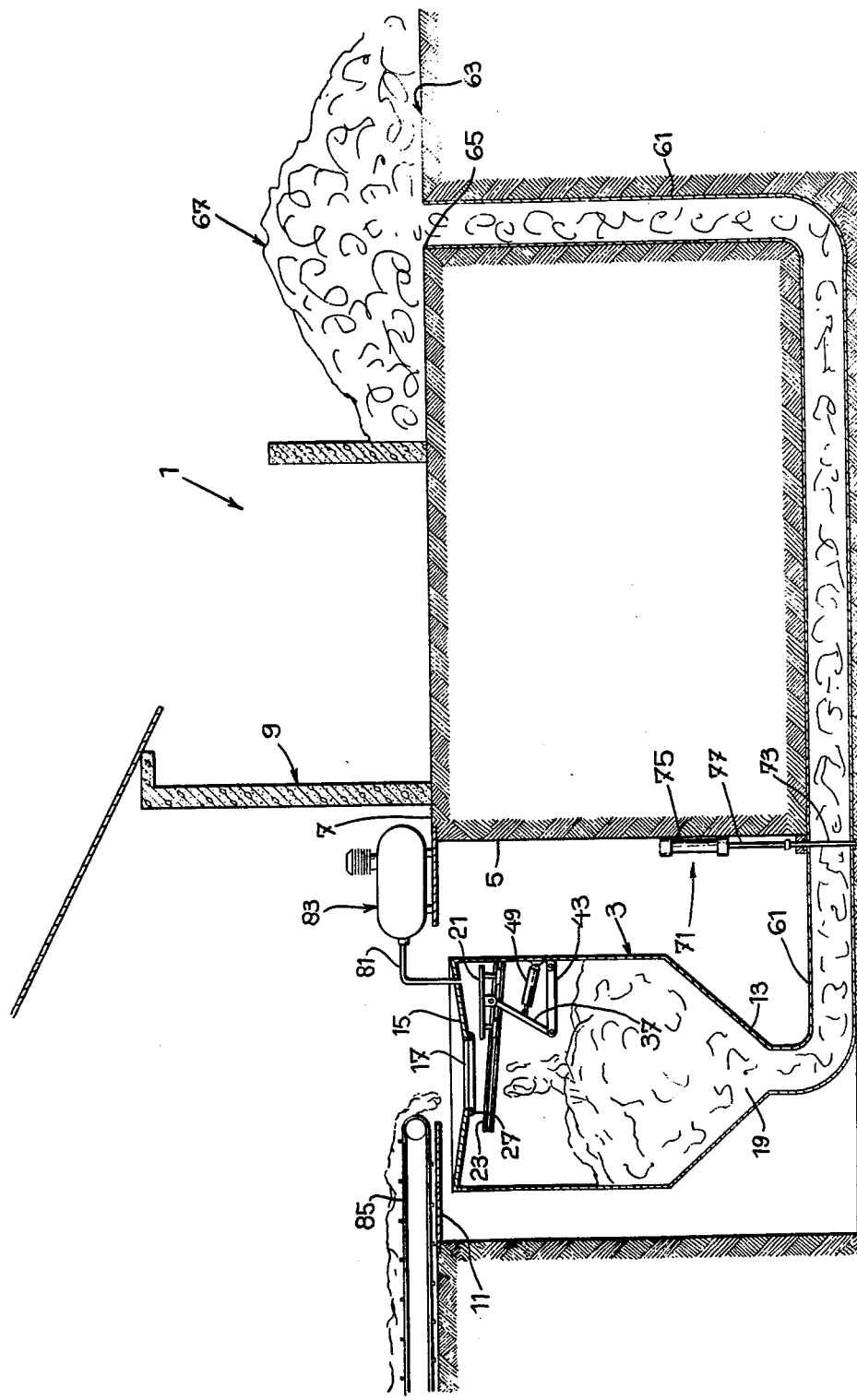
FIG. 1 is a cross-sectional view of the manure handling apparatus.

As shown in FIG. 1, the apparatus 1 includes a collecting container 3 for collecting the manure to be handled. The collecting container 3 is installed in a pit 5 constructed below the floor 7 of a barn 9. A cover 11 partially closes the top of pit 5, and is substantially level with floor 7.

The container 3 is cylindrical in shape with a conical bottom portion 13 and a slightly depressed top portion 15. A top inlet opening 17 is provided in the center of top portion 15, and a bottom outlet opening 19 is provided at the bottom of the bottom portion 13.

Figure 2:
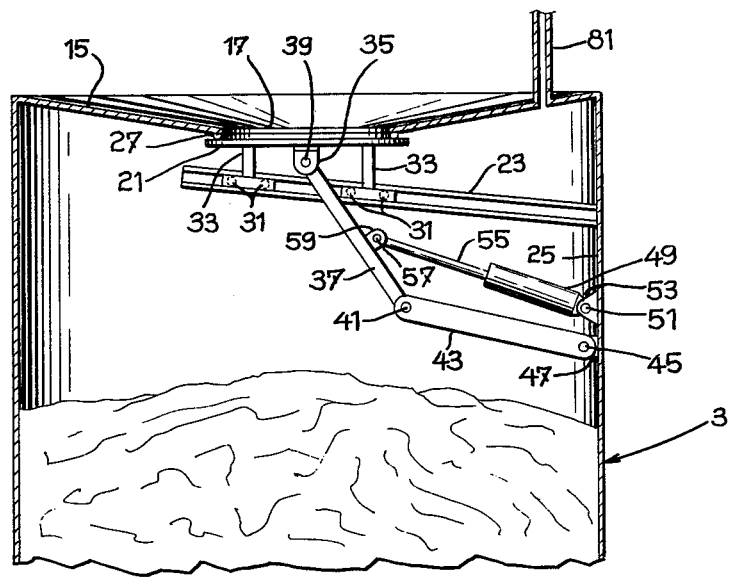
FIG. 2 is a detail side view of container inlet opening and closing means.
Figure 3:
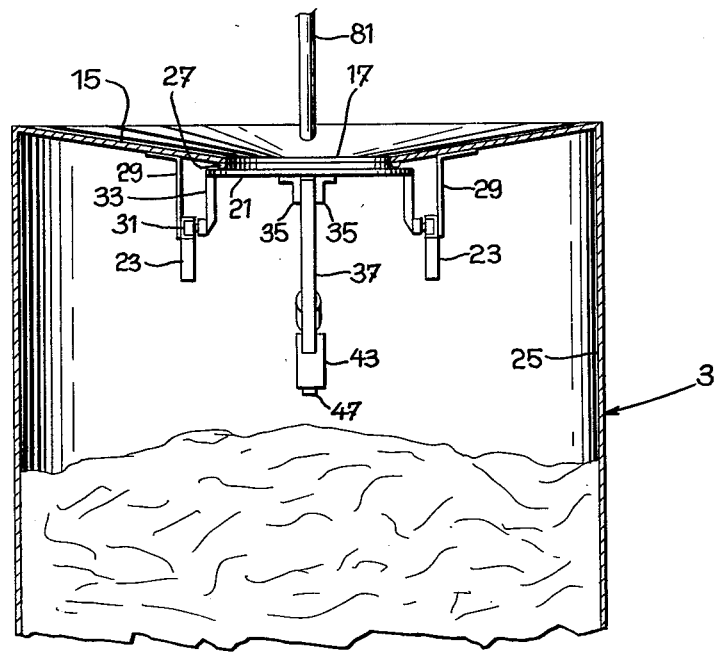
FIG. 3 is a detail front view of the opening and closing means.

Means are provided for opening and closing inlet opening 17. These means as shown in FIGS. 2 and 3 preferably include a plate 21 sized to close opening 17 and located within container 3. The closure plate 21 is movably mounted on a pair of guide rails 23 for linear movement between an open position, adjacent the wall 25 of container 3 and a closed position, tight against a resilient seal 27, on the inner surface of top portion 15, surrounding inlet opening 17. The guide rails 23 slope slightly upwardly from wall 25 toward inlet 17 while plate 21 is mounted on the rails in a substantially horizontal position so that the plate 21 is tightly wedged against all of seal 27 when the plate is moved to the closed position. The rails 23 are mounted in an inclined position with angle brackets 29 depending down from the top p portion 15 of the container 3. Rollers 31, mounted on supports 33 fixed to the sides of plate 21, guide the plate 21 for linear movement along the rails 23.

Means are provided for moving the closure plate 21 along the rails 23. These moving means include a pair of brackets 35 fixed to the bottom of plate 21 between the rails 23. A first link 37 is pivotably connected at one end with a pin 39 to the brackets 35. The other end of first link 37 is pivotably connected with a pin 41 to one end of a second link 43. The other end of second link 43 is pivotably connected with a pin 45 to a bracket 47 mounted on the wall 25 of container 3 between, and below, rails 23. First link 37 extends generally upwardly and second link 43 extends generally horizontally. A pneumatically operated cylinder 49 is mounted above second link and beneath rails 23. The cylinder 49 is pivotally mounted at one end by a pin 51 to a bracket 53 on wall 25. The free end of the movable rod 55 extending from cylinder 49 is pivotably mounted with a pin 57 to a bracket 59 on first link 37 intermediate its ends. Actuation of cylinder 53 by suitable means, not shown, to extend rod 55 will move plate 21 via first link 37 along the rails 23 to wedge it tight against seal 27 closing inlet 17. Actuation of cylinder 49 to move rod 55 in the opposite direction will move plate 21 away from the inlet 17, opening container 3 so it can be filled with manure.

The specific inlet opening and closing means described takes up little space within the container. In addition, with the linkage and cylinder 49 located at one side of the container, near the top, and with the plate sliding generally laterally on rails adjacent the container top 15 to open or close the inlet 17, little interference, from manure within the container, is encountered.

A conduit 61 is connected to the bottom outlet opening 19 in container 3 as shown in FIG. 1. The conduit 61 leads underground out from pit 5, and barn 9, and up to a manure collection area 63 near the barn 9. The outlet 65 of conduit 61 is in the approximate center of collection area 63 thus feeding fresh manure to the bottom center of a manure pile 77 already stored in collection area 63.

Means 71 are provided for opening or closing conduit 61. The means 71 comprise a valve 73 in conduit 61, operated by a pneumatic cylinder 75 mounted in the wall of pit 5. The cylinder 75 is connected to valve 73 by a rod 77. Two air lines, (not shown), leading from a source of pressurized air (not shown), are connected to the ends of cylinder 75.

A line 81, leading from a source of pressurized air 83, is connected to the top portion 15 of container 3. A valve (not shown) can be located in line 81.

In operation, manure is collected in barn 9 and carried to container 3 by a conveyor 85. Cylinder 49 is operated to move closure plate 21 and thus to open inlet opening 17. The conveyor 85 drops manure into container 3 through opening 17. Valve 73 is closed at this time preventing manure from flowing back, through conduit 71 from collecting area 63 to container 3.

When container 3 begins to fill up, the level of manure approaching the height of rails 23, manure is transferred out of container 3, through conduit 61 to the collecting area 63. To transfer manure out, plate 21 is moved to tightly close opening 17, and air pressure is built up within container 3, above the manure level, through the introduction of air under pressure from line 81. Valve 73 is raised by cylinder 75, opening conduit 71. The pressure in the top of container 3 forces the manure down and out through conduit 61 to the bottom center of the manure pile 67. Once the level of manure in container 3 has been lowered, valve 73 is lowered, closing conduit 61 and thus preventing feed-back, and container 3 is depressurized through suitable venting means (not shown) in line 81.

I claim:

1. An apparatus for evacuating manure, comprising:
   a container having a bottom, a side wall and a top wall, said top wall having an inlet opening for admitting manure into the container, the perimeter around the underside of said opening lying in a generally horizontal plane;
   a conduit connected to the bottom of said container, and leading away therefrom to a collection area;
   means mounted within said container for opening and closing said inlet opening, including: a closure plate having an area greater than that of said inlet opening; inclined rail means extending laterally and generally downwardly from the region of said inlet opening toward said container side wall; bracket means carried by said closure plate and movably engaged with said inclined rail means for mounting said closure plate in a generally horizontal plane parallel to the plane containing said underside perimeter of said inlet opening, said closure plate being movable upwardly and linearly along said inclined rail means between a lowered, open position laterally removed from said inlet opening and an upper, closed position in sealing engagement with said underside perimeter of said inlet opening; and means operable for moving said closure plate between said open and closed positions thereof;
   valve means connected in said conduit, and operable for opening and closing said conduit; and
   means connected with said container for introducing fluid under pressure into the top of said container after said closure plate has been moved to a closed position and said valve means has been opened, to move manure out of the container to said collection area via said conduit.

2. An apparatus for evacuating manure as claimed in claim 1, including additionally:
   a seal element mounted on the underside of said top wall to extend about said perimeter around the underside of said inlet opening, said closure plate being adapted to abut against the seal while being moved from its open to its closed position.

3. An apparatus for evacuating manure as claimed in claim 2, wherein said means operable for moving said closure plate includes a pneumatic cylinder, and wherein said valve means in said conduit is also operated by a pneumatic cylinder.

4. An apparatus for evacuating manure as claimed in claim 1, wherein said inclined rail means includes a pair of spaced, parallel rails, disposed to lie on opposite sides of said inlet opening, and wherein said means operable for moving said closure plate includes:
   a pair of pivotally connected links, the outer end of one of said links being pivotally connected with said closure plate, and the outer end of the other of said links being pivotally connected with said container side wall; and
   a pneumatic cylinder connected between said side wall and said one of said links, said pair of links being disposed between said pair of spaced rails.

5. An apparatus for evacuating manure as claimed in claim 1, wherein said container has a conical bottom portion, and wherein said top wall of said container is recessed with said inlet opening being positioned at the bottom of said recess, said container being installed in a pit.

* * * * *